United States Patent
Feichtinger et al.

(10) Patent No.: US 7,710,233 B2
(45) Date of Patent: May 4, 2010

(54) ELECTRIC MULTILAYER COMPONENT

(75) Inventors: Thomas Feichtinger, Graz (AT);
Gunther Pudmich, Koflach (AT);
Sebastian Brunner, Graz (AT); Alois Kleewein, Graz (AT); Robert Krumphals, Deutschlandsberg (AT)

(73) Assignee: Epcos AG, Munich (DE)

( * ) Notice: Subject to any disclaimer, the term of this patent is extended or adjusted under 35 U.S.C. 154(b) by 732 days.

(21) Appl. No.: 10/550,863

(22) PCT Filed: Mar. 4, 2004

(86) PCT No.: PCT/DE2004/000423

§ 371 (c)(1),
(2), (4) Date: Sep. 26, 2005

(87) PCT Pub. No.: WO2004/086432

PCT Pub. Date: Oct. 7, 2004

(65) Prior Publication Data

US 2006/0249758 A1   Nov. 9, 2006

(30) Foreign Application Priority Data

Mar. 27, 2003 (DE) .................. 103 13 891

(51) Int. Cl.
*H01F 5/00* (2006.01)

(52) U.S. Cl. .................................. 336/200

(58) Field of Classification Search .................. 336/65, 336/83, 200, 232; 361/301–303
See application file for complete search history.

(56) References Cited

U.S. PATENT DOCUMENTS

| | | | |
|---|---|---|---|
| 5,369,390 A | 11/1994 | Lin et al. | |
| 5,400,210 A | 3/1995 | Sugimoto et al. | 361/321.5 |
| 5,774,326 A | 6/1998 | McConnelee et al. | 361/313 |
| 5,820,995 A | 10/1998 | Niimi | 428/469 |
| 6,327,134 B1* | 12/2001 | Kuroda et al. | 361/303 |
| 6,344,961 B1* | 2/2002 | Naito et al. | 361/302 |
| 6,351,369 B1 | 2/2002 | Kuroda et al. | |
| 6,370,010 B1 | 4/2002 | Kuroda et al. | |
| 6,462,933 B2 | 10/2002 | Takeshima et al. | |

(Continued)

FOREIGN PATENT DOCUMENTS

DE    19931056    7/1999

(Continued)

OTHER PUBLICATIONS

G.D.C. Csete de Gyorgyfalva, I.M. Reaney; "Decomposition of NiMn2O4 spinel: an NTC thermistor material," J. European Ceramic Society, vol. 21, Issues 10-11, 2001, pp. 2145-2148.

(Continued)

*Primary Examiner*—Tuyen Nguyen
(74) *Attorney, Agent, or Firm*—Fish & Richardson P.C.

(57) ABSTRACT

An electrical component having multiple layers includes dielectric layers that are stacked to form a main body, electrodes positioned at intervals between at least some of the dielectric layers, and at least two bumps configured to act as electrical contacts for the electrical component. The bumps are on a surface of the main body. The electrical component also includes contacts in the main body that electrically connect bumps and electrodes. The electrodes define first and second electrode stacks, each of which contacts one of the bumps.

29 Claims, 6 Drawing Sheets

U.S. PATENT DOCUMENTS

| | | |
|---|---|---|
| 6,496,355 B1 | 12/2002 | Galvagni et al. |
| 6,556,420 B1 | 4/2003 | Naito et al. .............. 361/306.1 |
| 6,608,547 B1 | 8/2003 | Greier et al. |
| 6,620,753 B2 * | 9/2003 | Nakamura et al. .......... 501/137 |
| 2002/0064669 A1 | 5/2002 | Oobuchi et al. |
| 2002/0071258 A1 | 6/2002 | Mosley |
| 2002/0085334 A1 * | 7/2002 | Figueroa et al. .......... 361/301.4 |
| 2004/0172807 A1 | 9/2004 | Rose et al. |

FOREIGN PATENT DOCUMENTS

| | | |
|---|---|---|
| DE | 10019840 | 4/2000 |
| DE | 10120253 | 4/2001 |
| DE | 10019838 | 6/2001 |
| DE | 10027870 | 7/2001 |
| DE | 10224566 | 12/2003 |
| EP | 1115129 | 7/2001 |
| JP | 58-119623 | 7/1983 |
| JP | 62-12116 | 1/1987 |
| JP | 05-121207 | 5/1993 |
| JP | 06-029143 | 2/1994 |
| JP | 07-037757 | 2/1995 |
| JP | 08-124800 | 5/1996 |
| JP | 09-180907 | 7/1997 |
| JP | 11-186098 | 7/1999 |
| JP | 2000-049044 | 2/2000 |
| JP | 2000-208943 | 7/2000 |
| JP | 2000-226689 | 8/2000 |
| JP | 2001-118746 | 4/2001 |
| JP | 2001-148324 | 5/2001 |

OTHER PUBLICATIONS

Examination Report for German Application No. 10313891.9-34 dated Jul. 31, 2009, 4 pages.

Bezuk, "Flip Chip Challenges", Kyocera America, Inc., first published in HDI Magazine, Feb. 2000, 6 pages.

Translation of the Reason for Rejection, Oct. 19, 2009, Corresponding Japanese Application, 6 pages.

* cited by examiner

ELECTRIC MULTILAYER COMPONENT

TECHNICAL FIELD

The present invention relates to an electrical multilayer component whose main body is constructed from stacked dielectric material layers, between which electrode areas are positioned.

BACKGROUND

Multilayer components of this type may be used as capacitors, varistors, or temperature-dependent resistors (thermistors) depending on the composition of the dielectric material layers and the electrode layers. The main body of varistors is frequently manufactured from a mixture of different metal oxides, based on zinc oxide, for example. Varistors have non-linear voltage-dependent resistance change, which is used to protect an electrical circuit from overvoltage. The resistance value of varistors falls with increasing applied voltage in this case. Multilayer components which are implemented as capacitors may absorb noises at high and low voltages.

A multilayer varistor, in which non-overlapping internal electrodes are positioned in the interior of the main body to reduce the resistance, is known from the publication DE 199 31 056 A1. The internal electrodes are contacted in this case at the two front faces of the component by large-area contact layers which allow SMD mounting of the component. The disadvantage of this typical component is that because of the large-area contact layers, parasitic capacitances and inductances are built up, which make precise setting of the electric characteristics of the component difficult. Furthermore, because of the large contact layers, a component of this type correspondingly requires a large amount of space when mounted on circuit boards, for example. Furthermore, above all, modules in this construction, in which multiple components of this type are integrated, are especially large and therefore have an especially low integration density.

SUMMARY

The object of the present invention is to specify an electrical multilayer component having high integration density, which has significantly reduced parasitic capacitances and inductances and also allows especially simple and space-saving mounting on a circuit board, for example.

This object is achieved according to the present invention by an electrical multilayer component according to claim 1. Advantageous embodiments of the multilayer component are the object of dependent claims.

The present invention describes an electrical multilayer component whose function is selected from that of a capacitor, a temperature-dependent resistor, and a varistor. The multilayer component has a main body constructed from stacked dielectric material layers, multiple electrode areas being arranged in the main body at intervals between the dielectric layers, in which electrode areas electrodes are formed. Furthermore, at least two solder balls (bumps) are arranged on the surface of the main body for the electrical contact of the component, a bump being connected in each case in an electrically conductive way to at least one electrode via through contacts arranged in the main body, so that a first and a second electrode stack are formed. As defined in the present invention, electrode stacks may comprise not only multiple electrodes, but rather, in the limiting case, even only one electrode. The electrically conductive through contacts, which connect the electrodes to the bumps, are also referred to as vias. Because of the special contact of the electrodes, it is possible especially simply to integrate multiple passive components, varistors, thermistors, or capacitors in an electrical multilayer component according to the present invention.

A further advantage of the electrical component according to the present invention in relation to typical components which are implemented in SMD construction, for example, is that because of the bumps, which are used for the electrical contact of the electrodes arranged in the main body, significantly simpler contacting of the component is possible than in typical components. The bumps typically need much less space on the surface of the main body than large-area contact layers, which are used in case of typical SMD contacts. Because of the smaller size of the bumps, the parasitic capacitances and inductances are additionally significantly reduced in the component according to the present invention. Because of the smaller size of the bumps and the through contacts, it is also possible to integrate multiple individual components with a high integration density into the electrical multilayer component, so that multilayer component modules having multiple passive components may be constructed especially simply.

An electrode stack of a multilayer component according to the present invention may comprise multiple electrodes arranged in different electrode areas, these electrodes being connected to one another in an electrically conductive way using through contacts arranged in the main body (see, for example, FIG. 2B).

In an advantageous embodiment of the multilayer component according to the present invention, the at least two electrode stacks in the main body face one another, a region of the main body which has no electrode layers being provided between the two electrode stacks. This means that the electrodes of the first and second electrode stacks do not overlap one another. An embodiment of this type of the electrodes in the main body is especially advantageously suitable for the purpose of varying the resistance of the component depending on the precise embodiment of the electrodes.

In a further advantageous embodiment, the electrodes in the main body are arranged overlapping one another. If electrodes of the different first and second electrode stacks overlap one another, a capacitor effect may be achieved especially simply in the overlap region of the electrodes of different electrode stacks if they have different potentials applied to them.

Furthermore, it is possible to position additional (floating) electrodes in the main body which do not contact any of the bumps or the electrode stacks. In this way, two separate overlapping electrode structures may be connected in series internally. The floating electrodes, above all if they overlap with electrodes of the first or second electrode stack, ensure greater uniformity of the electrical characteristics of a multilayer component according to the present invention. Therefore, multilayer components according to the present invention which display an especially homogeneous electrical behavior may thus be manufactured using these electrodes.

Furthermore, a third electrode stack, which comprises at least one additionally provided electrode, may advantageously be provided in the main body and be connected in an electrically conductive way to a third bump on the surface of the main body via through contacts. The electrodes of the third electrode stack may then overlap with an electrode of the first and the second electrode stacks. An embodiment of this type allows the internal interconnection of multiple passive components. The interconnection and wiring outlay is thus reduced especially advantageously if the multilayer component is mounted on a circuit board, space on the circuit board also being saved. The third electrode stack may be used in this case as a shared ground contact, for example.

In an embodiment of the present invention, the electrodes of the first and second electrode stacks do not overlap, these electrodes then advantageously being used primarily for varying the resistance of the multilayer component. This embodiment may also be advantageous for constructing components having very small capacitances.

In a further embodiment, the first, second, and third electrode stacks may each comprise one electrode. In this case, only the electrode of the third electrode stack overlaps with the electrodes of the first and second electrode stacks. The electrodes of the first and second electrode stacks do not overlap in this case. This embodiment allows the integration of multilayer capacitors into the multilayer component according to the present invention especially simply, the electrode of the third electrode stack having the same potential in each case and the electrodes of the second and third electrode stacks being able to have potentials different therefrom in the case of interconnection. In this case, notwithstanding the second and third electrode stacks each having one electrode, still further electrode stacks each having one electrode may be provided, which overlap with the electrode of the third electrode stack (see, for example, FIG. 9).

In a further advantageous variation, the overlap areas between the electrodes of the different electrode stacks have different sizes. As already noted above, because of the overlap of electrodes of different electrode stacks, which have different potentials in case of interconnection, a capacitor effect occurs. In this case, because of the different sized overlap areas, different capacitances result (see, for example, FIGS. 3A and 3B). A further variation of the electrical properties of the individual passive components in the electrical multilayer component according to the present invention may thus advantageously be achieved. It is possible in this case that the overlap areas between the electrodes of the third electrode stack and the electrodes of the second and first electrode stacks have different sizes (see, for example, FIGS. 3A and 3B).

Furthermore, a fourth and a fifth electrode stack made of electrodes, which are connected via through contacts to a fourth and fifth bump on the surface of the main body, may be provided in the multilayer component according to the present invention. In this case, the electrodes of the fourth electrode stack overlap with the electrodes of the second and the fifth electrode stacks (see, for example, FIGS. 4A and 4B). Internal interconnections may again be implemented especially simply using this embodiment.

Furthermore, further electrode stacks which are connected to bumps via through contacts may be provided in the main body. In this way, further passive components, such as the above-mentioned capacitors, varistors, or thermistors, may be comprised in the multilayer component according to the present invention, so that especially many components may be provided at a high integration density in an especially small volume.

In the multilayer component according to the present invention, some of the electrodes which belong to different electrode stacks may advantageously be connected to one another in an electrically conductive way (see, for example, FIG. 8). Using these electrical connections, further especially simple and advantageous internal interconnections tailored to the particular intended use may be implemented in the multilayer component according to the present invention.

Furthermore, it is especially advantageous if all bumps are arranged on the same main surface of the main body of a multilayer component according to the present invention. It is then especially simply possible to connect the component to a carrier substrate via the bumps using a flip chip arrangement, for example. The flip chip construction allows especially space-saving and simple mounting of a multilayer component according to the present invention on a carrier substrate in this case.

Furthermore, the dielectric layers may advantageously comprise a ceramic material, since electroceramics are especially suitable. The ceramic material may thus comprise a varistor ceramics based on one of ZnO—Bi and ZnO—Pr. Furthermore, the ceramic material may comprise a capacitor ceramics which is selected from the NPO ceramics, e.g., (Sm, Pa) $NiCdO_3$. These ceramics have temperature-dependent $\in_r$ values and are not ferroelectric ceramics. Furthermore, ferroelectric ceramics having high dielectric constants, as well as doped $BaTiO_3$ and barrier layer ceramics, may be used. These dielectric ceramics are described in the book "Keramik [Ceramics]" by H. Schaumburg (Ed.), B. G. Teubner-Verlag Stuttgart 1994 on pages 351 through 352 and 363, reference being made to the entirety of these pages here. In addition, the ceramic material may be selected from thermistor ceramics, NTC ceramics, comprising at least one of nickel, manganese, spinel, and perowskite, for example. However, dielectric non-ceramic materials such as glass may also be used.

In an embodiment of a component according to the present invention, at least five electrode stacks are provided in the main body, the main body having an area which is smaller than 2.5 $mm^2$. The five bumps for contacting the electrode stacks are arranged on the same main surface in this case. In multilayer components according to the present invention having more passive integrated components, at least nine electrode stacks may be provided in the main body, for example, the main body having an area which is smaller than 5 $mm^2$. Nine bumps are provided on the same main surface of the main body for the electrical contact of the nine electrode stacks for especially simple flip chip contacting. If eleven electrode stacks are provided in the main body, the main body typically has an area which is smaller than 8 $mm^2$, the eleven bumps for contacting the electrode stacks also being arranged on the same main surface for flip-chip contacting.

Furthermore, in the component according to the present invention, all dielectric layers comprise advantageously at least one of a varistor, thermistor, or capacitor ceramics, so that preferably there are no dielectric layers in the main body which do not have at least one of these electrical properties.

In the following, the multilayer component according to the present invention is to be explained in greater detail on the basis of schematic figures and exemplary embodiments.

DETAILED DESCRIPTION

Figure 1:
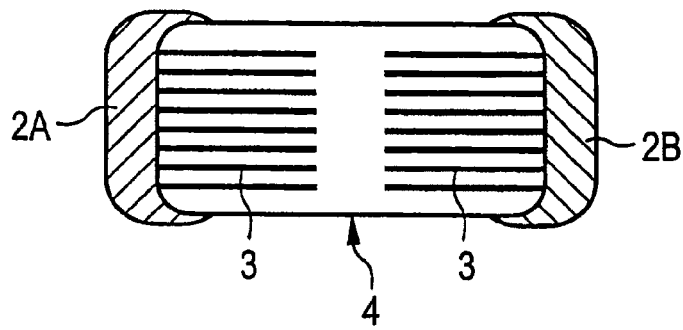
FIG. 1 shows a typical component in a cross-section view.

FIG. 1 shows a typical ceramic multilayer component, such as a varistor 4, in a cross-sectional view. Large-area terminal contacts 2A and 2B are arranged on opposite front faces of the component, wherein these terminal contacts contact electrodes 3 located in the interior of the main body. Thus, two electrode stacks are produced, each of electrode stacks contacting only one terminal contact. Because of the especially large contact areas of terminal contacts 2A and 2B, parasitic capacitances and inductances are present to a significant extent in this typical component. Furthermore, a relatively large amount of space is necessary for mounting this component on a carrier because of the large contact areas.

Figure 2A:
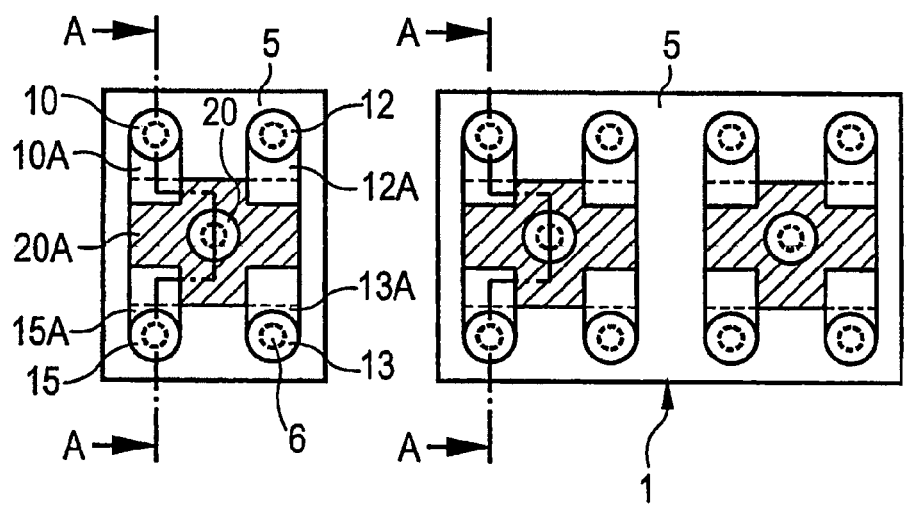
FIGS. 2A through 9 show different embodiments of multilayer components according to the present invention in a top view and in a cross-sectional view.

FIG. 2A shows a top view of two different embodiments of an electrical multilayer component according to the present invention. In this case, the bumps 10, 15, and 20, as well as further bumps, may be seen in the top view. Furthermore, the through contacts 6, which are located below the bumps 10, 15, and 20 in the ceramic main body, are indicated with dashed lines. Furthermore, each of the uppermost electrodes are shown, which may be seen in the top view. In this case, a first bump 10 is provided which contacts a first electrode 10A. The first bump faces a second bump 15 which contacts a second electrode 15A. Furthermore, a third bump 20 is provided which contacts a third electrode 20A in an electrically conductive way. In addition, two further electrodes 12 and 13 and two further bumps 12A and 13A may be recognized, which bumps assume the same position in relation to the third electrode 20A as do the first and second electrodes. The overlap areas between the electrode layers which contact different bumps represent capacitors, so that there are four capacitors in the component in the left top view, while there are correspondingly eight capacitors in the component in the right top view.

Figure 2B:
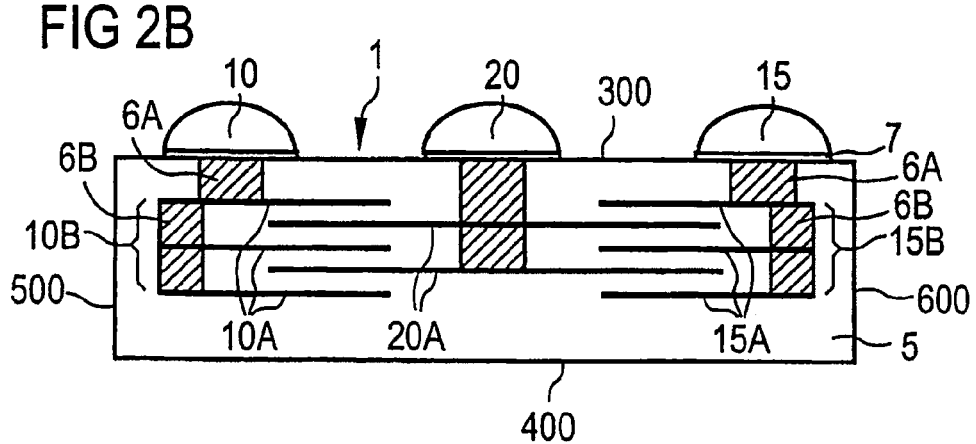

FIG. 2B shows a cross-sectional view along the line referenced by A through the component shown in a top view in FIG. 2A. In this case, a first electrode stack 10B made of first electrodes 10A may be seen, which is connected in an electrically conductive way to the first bump 10 be means of through contacts called vias 6A, 6B. Under-bump metal platings (UBM) 7 are arranged between the bumps and the through contacts. However, these under-bump metal platings do not necessarily have to be provided. For example, it is also possible for the bumps to be arranged directly on the through contacts. Furthermore, a second electrode stack 15B made of the second electrodes 15A is provided, which is connected in an electrically conductive way to the second bump 15. The first electrode stack 10B and the second electrode stack 15B each overlap with the electrodes 20A of the third electrode stack 20B, which is contacted via a third bump 20. If different potentials are applied to the different bumps, a capacitor effect occurs in the overlap areas between electrodes of different potentials. If, in addition, a varistor ceramics based on zinc oxide, for example, is used as the material for the main body 5, an internal arrangement of a varistor and a capacitor may be implemented in this component. The bumps 10, 15, 20 are advantageously arranged on a main surface 300 of the main body; through contacts 6A arranged closer to the bumps 10, 15, 20 being further from neighboring front faces 500, 600 than through contacts 6B arranged further from the bumps 10, 15, 20. This may have the advantage, among other things, that in this way the bumps 10, 15 neighboring the front faces are further from the front faces than they would be if all through contacts 6A, 6B were arranged one on top of another. In this way, among other things, the production of the bumps and the stacking of the dielectric layers are simplified.

Figure 2C:
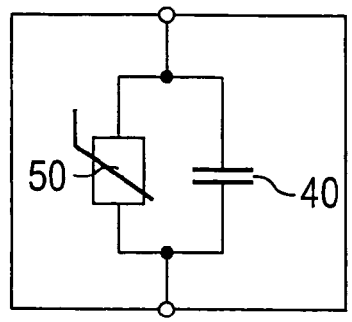

FIG. 2C shows a circuit diagram of the region of the component provided with a circle in FIG. 2B. It may be seen that a parallel circuit is implemented between a varistor 50 and a capacitor 40 in this area.

Figure 3A:
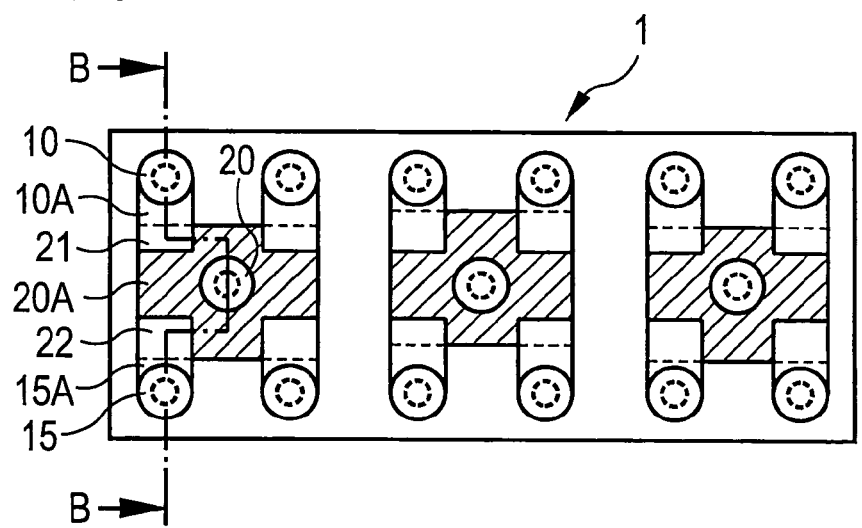

FIG. 3A shows a further advantageous embodiment of a component according to the present invention in a top view. In this case, analogously to FIG. 2A, an arrangement made of a first electrode 10A, a second electrode 15A, and a third electrode 20A may be seen, whereas each of these electrodes contacts and overlaps different bumps 10, 15, 20. In contrast to FIG. 2A, however, different sized overlap areas between the first electrode 10A and the third electrode 20A and, in addition, between the second electrode 15A and the third electrode 20A are implemented. These different sized overlap areas are referenced by 21 and 22. Because of the different sized overlap areas, different capacitance values may thus be implemented especially simply. A total of 12 multilayer capacitors are arranged in the component main body in this top view, each 4 multilayer capacitors being interconnected internally to one another via a shared third electrode.

Figure 3B:
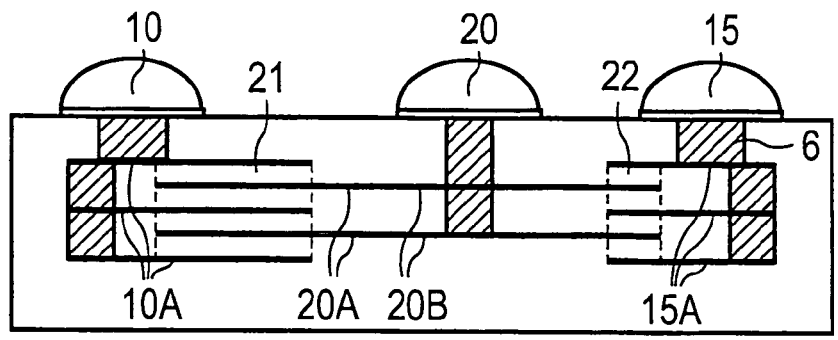

FIG. 3B shows a cross-sectional view through the line referenced by B in FIG. 3A. In this case, the different sized overlap areas 21 and 22 between the first electrode 10A and third electrode 20A and between the second electrode 15A and the third electrode 20A may be seen clearly.

Figure 4A:
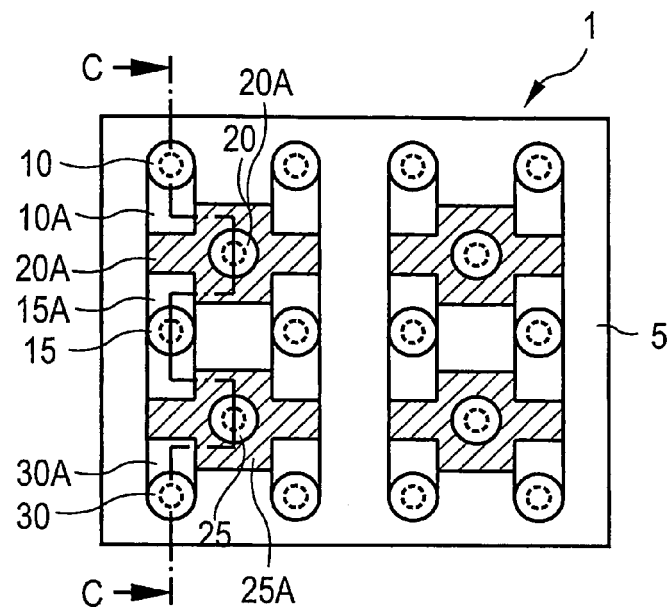

FIG. 4A shows a top view of a further embodiment of a multilayer component according to the present invention. In contrast to the embodiments shown until now, the second electrode 15A contacts, apart from the third electrode 20A, the fourth electrode 25A being connected to a fourth bump 25. Furthermore, a fifth bump 30 is provided, which is connected in an electrically conductive way to a fifth electrode 30A and only overlaps with the fourth electrode 25A. The fourth additional electrode thus overlaps both with the second electrode and also with the fifth electrode. Further internal interconnections may be implemented especially simply in the multilayer component according to the present invention with the aid of this arrangement. In the top view of this component, a total of 16 multilayer capacitors may be recognized, wherein each of said multilayer capacitors is produced at the overlap areas between the electrodes of different electrode stacks, eight multilayer capacitors each being interconnected internally to one another.

Figure 4B:
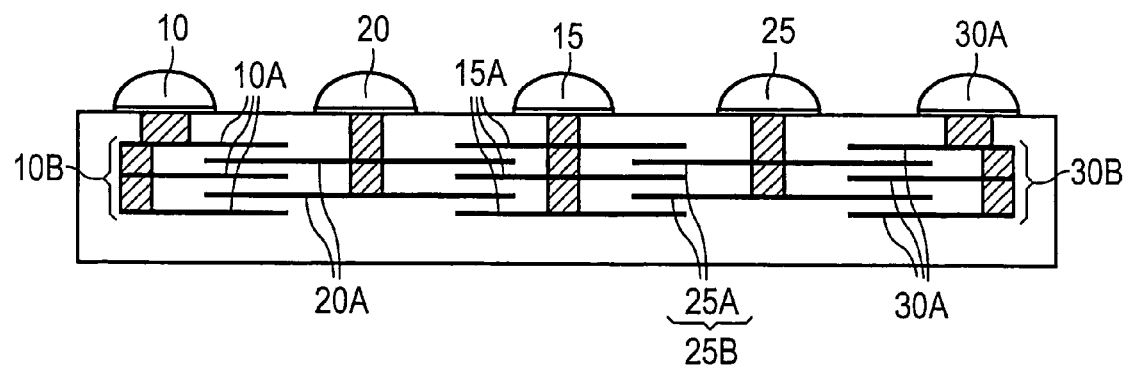

FIG. 4B shows a cross-sectional view along the line referenced with C through the component shown in a top view in FIG. 4A. The third electrodes 20A may be contacted with ground via the third bump 20, and the fourth electrodes 25A may be contacted with ground via the fourth bump 25.

Figure 5A:
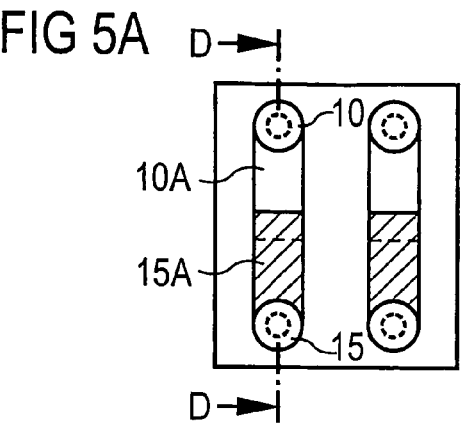

FIG. 5A shows a top view of an embodiment of a multilayer component according to the present invention in which two multilayer capacitors are implemented that are not internally interconnected to one another.

Figure 5B:
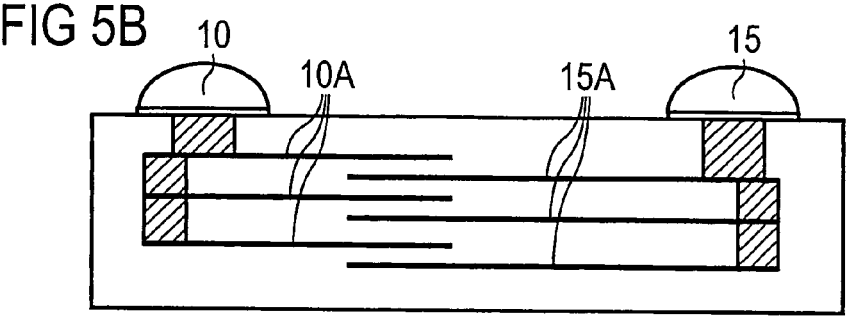

FIG. 5B shows a cross-sectional view through the line referenced with D in FIG. 5A. First electrodes 10A, which overlap with second electrode 15A and are each connected in an electrically conductive way to bumps 10 and 15, may be seen.

Figure 6A:
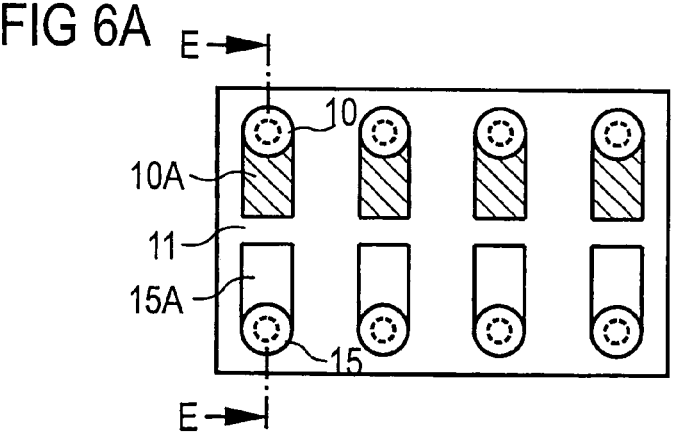

FIG. 6A shows a top view of an embodiment of the multilayer component, in which a total of eight electrodes face one another without overlapping, so that a region 11 having no electrodes is provided in the main body between the electrodes. Arrangements of this type may be used for the purpose, for example, of altering the component resistance, the varistor voltage, or the capacitance arbitrarily.

Figure 6B:
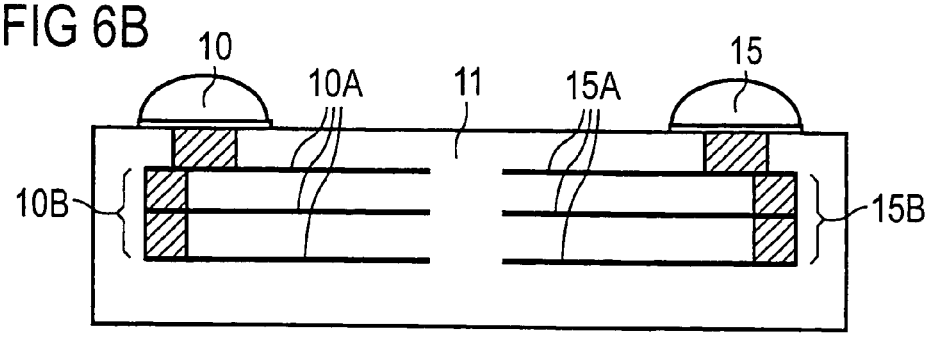

FIG. 6B shows a cross-sectional view through the line referenced with E in FIG. 6A. The two electrode stacks 10B and 15B face one another in the main body 5, the region 11 without electrodes being provided between the two electrode stacks.

Figure 7A:
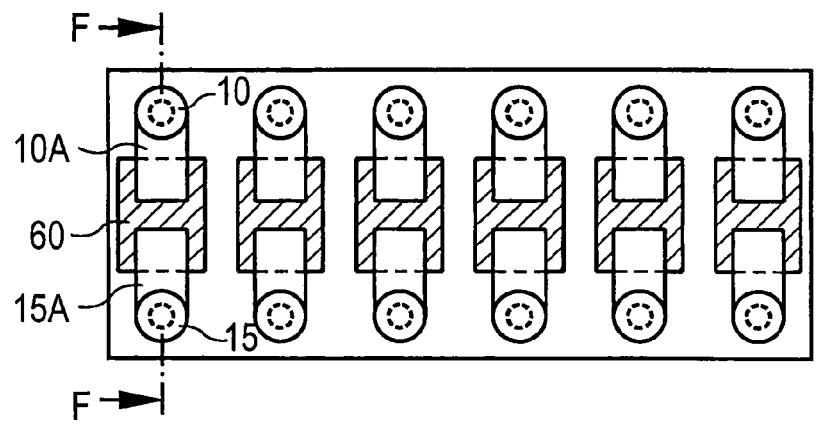

FIG. 7A shows a top view of an arrangement made of electrodes 10A and 15A connected to bumps 10 and 15 and floating electrodes 60, which are not contacted by a bump. These additional electrode layers may especially advantageously ensure greater uniformity of the electrical characteristics of the component.

Figure 7B:
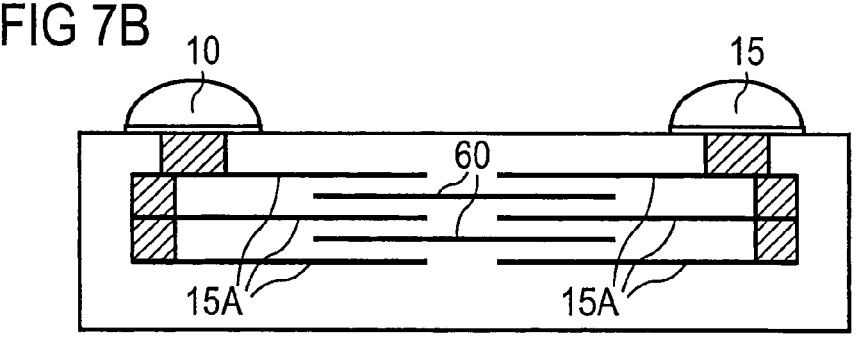

FIG. 7B shows a cross-sectional view through the line referenced with F in FIG. 7A. It may be seen in this case that the additional floating electrodes 60 overlap with the first electrodes 10A and the second electrodes 15A.

Figure 8:
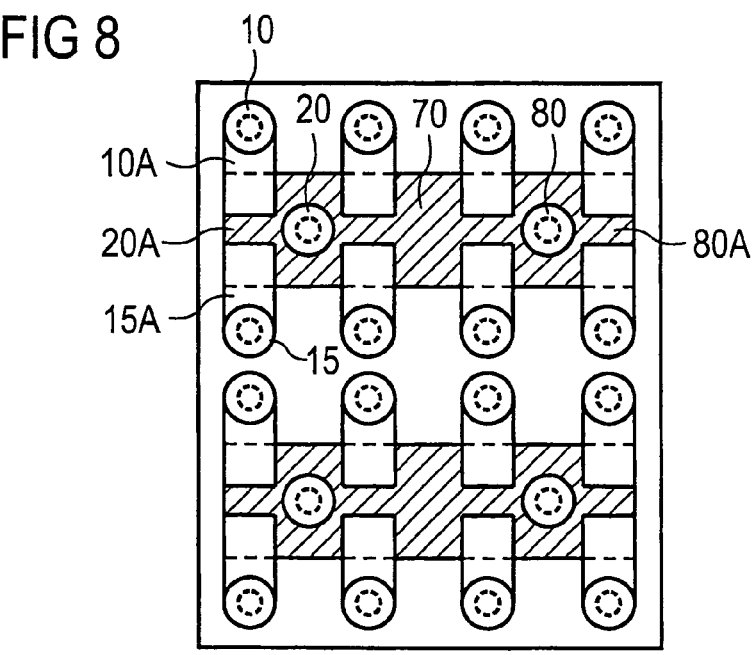

FIG. 8 shows a further favorable variation of a multilayer component according to the present invention, in which the electrodes 20A and 80A, which are contacted by different bumps 20 and 80, are connected to one another in an electrically conductive way via a connection 70. Further internal interconnections may thus be implemented especially advantageously in components according to the present invention.

Figure 9:
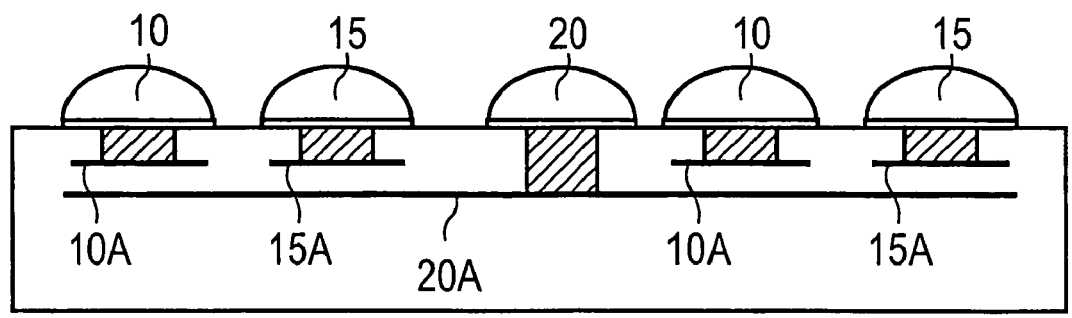

FIG. 9 shows a cross-sectional view of a further variation of a multilayer component according to the present invention, in which electrodes 10A and 15A, which do not overlap one another, overlap with a single large electrode 20A, which is contacted by a bump 20 and may be contacted with ground, for example.

Figure 10:
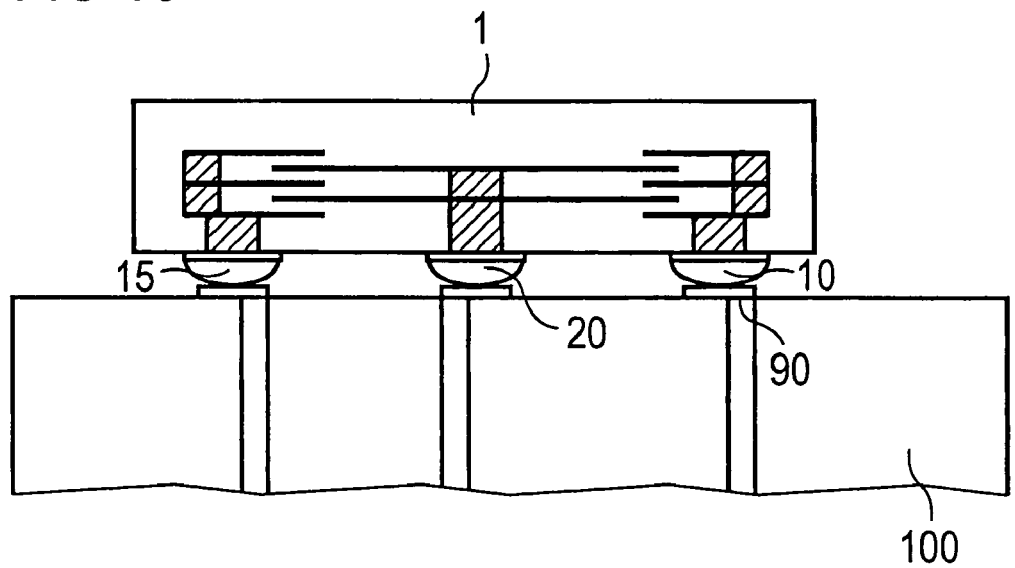
FIG. 10 shows a multilayer component according to the present invention which is mounted on a carrier substrate.

FIG. 10 shows a cross-sectional view of an arrangement of a component 1 according to the present invention, which is mounted via the bumps 10, 15, 20 via contact pads 90 on a carrier substrate 100 using flip chip arrangement with clearance. The flip chip arrangement allows especially simple, rapid, and cost-effective mounting of the components according to the present invention, these components being able to be mounted directly neighboring one another without larger intervals on the substrate 100.

The through contacts in all embodiments shown may be produced, for example, by producing through holes, using a stamping tool in the main body, for example, an electrically conductive material comprising at least one of Ag, AgPd, AgPdPt, AgPt, Pd, Pt, and Cu then being arranged in the through holes. The through contacts in the form of through holes advantageously have circular cross-sections in this case, as shown in FIG. 2A, for example, but may also have angled cross-sections. The through holes may advantageously be produced in the dielectric material layers, the electrically conductive material then being filled into the through holes. The through contacts form channels in the main body which, as shown in FIGS. 2A and 2B, for example, preferably run perpendicularly to the main surfaces of the ceramic main body. The bumps are arranged on both main surfaces of the main body and/or only on one main surface of said main body. Subsequently, the stacked dielectric material layers, e.g., ceramic green films, may then be sintered together with the electrically conductive material arranged in the through holes in one method step, the finished sintered main body having the through contacts being produced. The sintering temperature is selected in this case as a function of the composition of the dielectric layers, e.g., 1000° C. to 1300° C. for varistor ceramics and temperatures of approximately 850° C. to 1100° C. for other ceramics, e.g., for capacitor ceramics. Subsequently, the under-bump metal platings and the bumps are then optionally produced. For example, solder paste may be applied using printing methods, e.g., in the screen printing method, and then melted. In other embodiments of the present invention, the bumps may also be placed and then melted or produced using immersion wetting in hot solder (immersion solder bumping), for example. Stud bumping is also possible, wherein bumps are produced, whereas a solder wire is first melted and then cut off.

The present invention is not restricted to the exemplary embodiments described here. Further variations are possible, above all in regard to the number of the passive components arranged in the main body and their internal interconnections.

The invention claimed is:

1. An electrical component having multiple layers, the electrical component comprising:
   dielectric layers that are stacked to form a main body;
   electrodes positioned at intervals between at least some of the dielectric layers;
   at least two bumps configured to act as electrical contacts for the electrical component, the bumps being on a surface of the main body; and
   contacts in the main body that electrically connect bumps and electrodes;
   wherein the electrodes comprise first and second electrode stacks, each of the first and second electrode stacks contacting one of the bumps;
   wherein the electrodes in at least the first electrode stack are electrically connected to first contacts and second contacts, the first contacts being offset from the second contacts; and
   wherein within the first electrode stack at least one of the bumps is connected to at least one of the electrodes by the first contacts, and at least a pair of two consecutive electrodes are connected by the second contacts.

2. The electrical component of claim 1, wherein a first contact electrically connects electrodes in the first electrode stack to a bump, and a second contact electrically connects electrodes in the second electrode stack to a bump.

3. The electrical component of claim 1, wherein the first and second electrode stacks face each other in the main body; and
   wherein the main body comprises a region between the first and second electrode stacks that does not contain an electrode.

4. The electrical component of claim 1, wherein electrodes from the first and second electrode stacks overlap.

5. The electrical component of claim 1, further comprising:
   floating electrodes in the main body, wherein the floating electrodes do not contact the bumps.

6. The electrical component of claim 5, wherein the floating electrodes overlap electrodes from at least one of the first and second electrode stacks.

7. The electrical component of claim 1, further comprising:
   a third bump on a surface of the main body; and
   a third electrode stack in the main body, the third electrode stack comprising at least one electrode the third electrode stack being electrically connected to the third bump via a contact;
   wherein the at least one electrode in the third electrode stack overlaps an electrode in at least one of the first and second electrode stacks.

8. The electrical component of claim 7, wherein electrodes in the first and second electrode stacks do not overlap.

9. The electrical component of claim 7, wherein the first, second, and third electrode stacks each comprise one electrode.

10. The electrical component of claim 7, wherein overlap areas between electrodes from different electrode stacks have different sizes.

11. The electrical component of claim 7, wherein electrode overlap areas between the third electrode stack and the first electrode stacks have different sizes than electrode overlap areas between the third electrode stack and the second electrode stack.

12. The electrical component of claim 7, further comprising:
   a fourth bump on a surface of the main body;
   a fifth bump on a surface of the main body;

a fourth electrode stack comprising electrodes in the main body;
a fifth electrode stack comprising electrodes in the main body; and
contacts that contact the fourth electrode stack to the fourth bump and that contact the fifth electrode stack to the fifth bump;
wherein electrodes in the fourth electrode stack overlap electrodes in the second electrode stack and electrodes in the fifth electrode stack.

13. The electrical component of claim 1, further comprising:
additional bumps on the surface of the main body; and
additional electrode stacks in the main body, each of the additional electrode stacks being connected to a corresponding additional bump.

14. The electrical component of claim 13, wherein at least some electrodes from different electrode stacks are electrically connected to one another.

15. The electrical component of claim 12, wherein all bumps are on a same main surface of the main body.

16. The electrical component of claim 1, wherein the dielectric layers comprise a ceramic material.

17. The electrical component of claim 16, wherein the ceramic material comprises a varistor ceramic based on one of ZnO—Bi and ZnO—Pr.

18. The electrical component of claim 16, wherein the ceramic material comprises a capacitor ceramic comprising one of NPO ceramics and doped $BaTiO_3$.

19. The electrical component of claim 16, wherein the ceramic material comprises at least one of nickel, manganese, spinel, and perowskite.

20. The electrical component of claim 1, wherein the dielectric layers comprise glass.

21. The electrical component of claim 1, further comprising:
at least three additional bumps on the surface of the main body; and
at least three additional electrode stacks in the main body, each of the electrode stacks being electrically connected to a corresponding bump;
wherein the main body has an area of less than 2.5 $mm^2$.

22. The electrical component of claim 1, further comprising:
at least seven additional bumps on the surface of the main body; and
at least seven additional electrode stacks in the main body, each of the electrode stacks being electrically connected to a corresponding bump;
wherein the main body has an area of less than 5.12 $mm^2$.

23. The electrical component of claim 1, further comprising:
at least nine additional bumps on the surface of the main body; and
at least nine additional electrode stacks in the main body, each electrode stack being electrically connected to a corresponding bump;
wherein the main body has an area of less than 8 $mm^2$.

24. The electrical component of claim 1, wherein the contacts comprise channels in the main body that contain an electrically conductive material.

25. The electrical component of claim 24, wherein the channels have one of a round and a rectangular cross-section.

26. The electrical component of claim 1, further comprising:
additional contacts in the main body that electrically interconnect electrodes in a single electrode stack the additional contacts being in different dielectric layers and being offset from one another, the electrical component comprising first additional contacts for the first electrode stack and second additional contacts for the second electrode stack.

27. The electrical component of claim 26, wherein the main body has two opposite main surfaces and two front faces, the bumps being on the main surfaces; and
wherein contacts closer to the bumps are at a greater distance from neighboring front faces of the electrical component than contacts farther away from the bumps.

28. The electrical component of claim 24, wherein the electrically conductive material comprises at least one of Ag, AgPd, AgPt, AgPdPt, Pd, Pt, and Cu.

29. An arrangement comprising:
the electrical component of claim 1; and
a carrier substrate comprising contact pads for connecting to the electrical component, the contact pads being on a surface of the carrier substrate;
wherein the electrical component is mounted on the carrier substrate in a flip chip arrangement with clearance relative to the carrier substrate; and
wherein the electrical component is electrically connected to the contact pads via the bumps.

* * * * *

UNITED STATES PATENT AND TRADEMARK OFFICE
CERTIFICATE OF CORRECTION

PATENT NO. : 7,710,233 B2
APPLICATION NO. : 10/550863
DATED : May 4, 2010
INVENTOR(S) : Thomas Feichtinger et al.

It is certified that error appears in the above-identified patent and that said Letters Patent is hereby corrected as shown below:

Col. 8, line 44, claim 7, delete "electrode" and insert -- electrode, --.

Col. 9, line 29, claim 18, delete "NPO" and insert -- NP0 --.

Col. 9, line 32, claim 19, delete "perowskite" and insert -- perovskite --.

Col. 10, line 21, claim 26, delete "stack" and insert -- stack, --.

Signed and Sealed this

Thirteenth Day of July, 2010

David J. Kappos
*Director of the United States Patent and Trademark Office*